(12) United States Patent
Sung et al.

(10) Patent No.: US 11,165,263 B2
(45) Date of Patent: Nov. 2, 2021

(54) WIRELESS BATTERY MANAGEMENT SYSTEM AND METHOD FOR PROTECTING BATTERY PACK USING SAME

(71) Applicant: LG Chem, Ltd., Seoul (KR)

(72) Inventors: Chang-Hyun Sung, Daejeon (KR); Jae-Dong Park, Daejeon (KR); Sang-Hoon Lee, Daejeon (KR); Yean-Sik Choi, Daejeon (KR)

(73) Assignee: LG Chem, Ltd.

( * ) Notice: Subject to any disclaimer, the term of this patent is extended or adjusted under 35 U.S.C. 154(b) by 123 days.

(21) Appl. No.: 16/611,735

(22) PCT Filed: Nov. 8, 2018

(86) PCT No.: PCT/KR2018/013552
§ 371 (c)(1),
(2) Date: Nov. 7, 2019

(87) PCT Pub. No.: WO2019/103364
PCT Pub. Date: May 31, 2019

(65) Prior Publication Data
US 2020/0106278 A1    Apr. 2, 2020

(30) Foreign Application Priority Data

Nov. 24, 2017   (KR) .......................... 10-2017-0158539

(51) Int. Cl.
*H02J 7/00*        (2006.01)
*H02J 50/80*    (2016.01)
(Continued)

(52) U.S. Cl.
CPC .......... *H02J 7/0021* (2013.01); *H01M 10/425* (2013.01); *H02J 7/025* (2013.01);
(Continued)

(58) Field of Classification Search
CPC .......... H02J 7/0021; H02J 50/80; H02J 50/40; H02J 7/025; H02J 7/00309; H02J 7/00308;
(Continued)

(56) References Cited

U.S. PATENT DOCUMENTS 9,564,762 B2 *  2/2017  Lee ...................... H02J 7/0016
2009/0146610 A1  6/2009  Trigiani
(Continued)

FOREIGN PATENT DOCUMENTS

EP      3217464 A1      9/2017
JP      2003009403 A    1/2003
(Continued)

OTHER PUBLICATIONS

Extended European Search Report including Written Opinion for Application No. EP18881928.8, dated May 26, 2020, pp. 1-9.
(Continued)

*Primary Examiner* — Stacy Whitmore
(74) *Attorney, Agent, or Firm* — Lerner, David, Littenberg, Krumholz & Mentlik, LLP

(57) ABSTRACT

Disclosed are a wireless battery management system and a method for protecting a battery pack using the same. The battery pack includes a plurality of battery modules and at least one relay. The wireless battery management system includes a plurality of slave controllers electrically coupled to the plurality of battery modules one-to-one, and a master controller wirelessly coupled to each slave controller so as to be able to communicate with each slave controller. Each slave controller measures an operational parameter of the battery module electrically coupled thereto. Each slave controller wirelessly transmits a fault signal to the master controller when the measured operational parameter is outside of a predetermined normal range. The master controller (Continued)

turns off the at least one relay when the fault signal is received.

10 Claims, 5 Drawing Sheets

(51) Int. Cl.
    *H02J 50/40* (2016.01)
    *H01M 10/42* (2006.01)
    *H02J 7/02* (2016.01)

(52) U.S. Cl.
    CPC .............. *H02J 50/40* (2016.02); *H02J 50/80* (2016.02); *H01M 10/4257* (2013.01); *H01M 2010/4271* (2013.01)

(58) Field of Classification Search
    CPC .... H02J 7/0047; H02J 7/0031; H02J 7/00032; H02J 7/00; H01M 10/425; H01M 10/4257; H01M 2010/4271; H01M 10/482; Y02E 60/10; Y02T 10/70
    See application file for complete search history.

(56) References Cited

U.S. PATENT DOCUMENTS

| | | |
|---|---|---|
| 2010/0073003 A1 | 3/2010 | Sakurai et al. |
| 2013/0149578 A1 | 6/2013 | Uchida |
| 2013/0271072 A1 | 10/2013 | Lee et al. |
| 2014/0347014 A1 | 11/2014 | Lee et al. |
| 2014/0365792 A1 | 12/2014 | Yun |
| 2016/0056510 A1 | 2/2016 | Takeuchi et al. |
| 2016/0223616 A1 | 8/2016 | Yoshino et al. |
| 2016/0226263 A1 | 8/2016 | Seo et al. |
| 2016/0268642 A1 | 9/2016 | Yamazoe et al. |
| 2016/0325626 A1 | 11/2016 | Honda et al. |
| 2017/0125830 A1 | 5/2017 | Jeon |
| 2017/0149101 A1 | 5/2017 | Sakabe |
| 2017/0351561 A1 | 12/2017 | Yamazoe et al. |
| 2018/0012484 A1 | 1/2018 | Sakabe et al. |
| 2018/0248234 A1 | 8/2018 | Okabe et al. |

FOREIGN PATENT DOCUMENTS

| | | |
|---|---|---|
| JP | 201081716 A | 4/2010 |
| JP | 2012085491 A | 4/2012 |
| JP | 2013541320 A | 11/2013 |
| JP | 2014239639 A | 12/2014 |
| JP | 5860886 B2 | 2/2016 |
| JP | 2016143113 A | 8/2016 |
| JP | 2016143593 A | 8/2016 |
| KR | 20100098550 A | 9/2010 |
| KR | 20130101457 A | 9/2013 |
| KR | 20140060801 A | 5/2014 |
| KR | 20140143076 A | 12/2014 |
| KR | 20160095524 A | 8/2016 |
| KR | 10-1724500 B1 | 4/2017 |
| KR | 101724500 B1 | 4/2017 |
| KR | 20170059226 A | 5/2017 |
| WO | 2013035176 A1 | 3/2013 |
| WO | 2014103008 A1 | 7/2014 |
| WO | 2015063945 A1 | 5/2015 |
| WO | 2015121979 A1 | 8/2015 |
| WO | 2015181866 A1 | 12/2015 |
| WO | 2016072002 A1 | 5/2016 |
| WO | 2017072949 A1 | 5/2017 |
| WO | 2017098686 A1 | 6/2017 |

OTHER PUBLICATIONS

International Search Report in PCT/KR2018/013552, dated Feb. 18, 2019, 2 pages.

\* cited by examiner

WIRELESS BATTERY MANAGEMENT SYSTEM AND METHOD FOR PROTECTING BATTERY PACK USING SAME

CROSS-REFERENCE TO RELATED APPLICATIONS

The present application is a national phase entry under 35 U.S.C. § 371 of International Application No. PCT/KR2018/013552 filed Nov. 8, 2018, published in Korean, which claims priority from Korean Patent Application No. 10-2017-0158539 filed Nov. 24, 2017, all of which are incorporated herein by reference.

TECHNICAL FIELD

The present disclosure relates to a wireless battery management system and a method for protecting a battery pack using the wireless battery management system.

BACKGROUND ART

Recently, there is dramatically growing demand for portable electronic products such as laptop computers, video cameras and mobile phones, and with the extensive development of electric vehicles, accumulators for energy storage, robots and satellites, many studies are being made on high performance secondary batteries that can be recharged repeatedly.

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages of free charging and discharging, a very low self-discharge rate and high energy density.

A battery pack applied to electric vehicles generally includes a plurality of battery modules connected in series and a plurality of battery controllers. Each battery controller monitors and controls the state of the battery module that the battery controller manages. Recently, to meet the demand for high-capacity high-output battery packs, the number of battery modules included in the battery pack also increases. To efficiently manage the state of each battery module included in the battery pack, a single master-multi slave structure is disclosed. The single master-multi slave structure includes a plurality of slave controllers installed in each battery module and a master controller that controls the overall operation of the plurality of slave controllers.

In this instance, a wireless battery management system may be provided in which a wireless communication is established between the plurality of slave controllers and the master controller. For the wireless battery management system to protect each of the battery modules, each slave controller needs to wirelessly transmit a signal indicating the state monitoring result for the each of battery modules properly to the master controller. In the event of maloperation of a radio frequency system on a chip (RF-SOC) responsible for a wireless communication function of each slave controller for wireless communication with the master controller, even though the state of each of the battery modules is properly monitored by each slave controller, it is impossible to transmit a signal indicating the monitoring result to the master controller.

DISCLOSURE

Technical Problem

The present disclosure is directed to providing a wireless battery management system including a plurality of slave controllers and a master controller wirelessly coupled to each slave controller so as to be able to communicate with each slave controller.

The present disclosure is further directed to providing a wireless battery management system for protecting each battery module included in a battery pack from over voltage, under voltage and/or over temperature in the event of maloperation of a wireless communication unit of a slave controller and a method for protecting the battery pack using the same.

These and other objects and advantages of the present disclosure will be understood by the following description and will be apparent from the embodiments of the present disclosure. Further, it will be readily understood that the objects and advantages of the present disclosure can be realized by the means set forth in the appended claims and combinations thereof.

Technical Solution

Various embodiments of the present disclosure for achieving the above-described object are as follows.

A wireless battery management system for protecting a battery pack including a plurality of battery modules and at least one relay according to an embodiment of the present disclosure includes a plurality of slave controllers electrically coupled to the plurality of battery modules one-to-one, and a master controller wirelessly coupled to each slave controller so as to be able to communicate with each slave controller. Each slave controller includes an operational parameter measurement circuit configured to measure an operational parameter of the battery module electrically coupled to said slave controller, a power supply configured to output an operating voltage using electrical energy stored in the battery module electrically coupled to said slave controller, a wireless communication circuit configured to wirelessly transmit a sensing signal indicating the measured operational parameter to the master controller using the operating voltage, and one or more processors operably coupled to the operational parameter measurement circuit, the power supply and the wireless communication circuit. The one or more processors is configured to control outputting a first control signal to the wireless communication circuit when the measured operational parameter is outside of a predetermined normal range. The wireless communication circuit is configured to wirelessly transmit a fault signal to the master controller when the first control signal is received. The master controller is configured to turn off the at least one relay when the fault signal is received from at least one of the plurality of slave controllers.

The one or more processors may be configured to output a second control signal to the power supply unit when the measured operational parameter is outside of a predetermined safety range. The safety range may be wider than the normal range.

The power supply unit may be configured to stop outputting the operating voltage to inactivate a wireless communication function with the master controller when the second control signal is received from the one or more processors. The power supply unit may include a converter configured to convert a module voltage of the battery module to the operating voltage, and a switch electrically coupled between the converter and the wireless communication circuit, and configured to supply the operating voltage from the converter to the wireless communication unit while the switch is in a turn-on state. The switch may be configured to be turned off in response to the second control signal.

The master controller may be configured to calculate the number of slave controllers capable of wireless communication with the master controller from the plurality of slave controllers. The master controller may be configured to turn off the at least one relay when the calculated number is equal to or less than a threshold number.

The master controller may be configured to increase a count for each slave controller each time a wireless communication function of each slave controller is determined to be inactivated. The master controller may be configured to turn off the at least one relay when the increased count is larger than a threshold count.

The master controller may be configured to determine the threshold count based on the calculated number when the calculated number is larger than the threshold number.

The operational parameter may be a temperature of the battery module or a cell voltage of each battery cell included in the battery module.

A battery pack according to another embodiment of the present disclosure includes the wireless battery management system.

A method for protecting a battery pack including a plurality of battery modules and at least one relay includes measuring, by each slave controller, an operational parameter of the battery module, wirelessly transmitting, by each slave controller, a sensing signal indicating the measured operational parameter to the master controller using electrical energy stored in the battery module, wirelessly transmitting, by each slave controller, a fault signal to the master controller when the measured operational parameter is outside of a predetermined normal range, inactivating, by each slave controller, a wireless communication function of each slave controller when the measured operational parameter is outside of a predetermined safety range, the safety range being wider than the normal range, and turning off, by the master controller, the at least one relay when the fault signal is received from at least one of the plurality of slave controllers or when the wireless communication function of at least one of the plurality of slave controllers is inactivated for a time corresponding to a threshold count or longer.

Advantageous Effects

According to at least one of the embodiments of the present disclosure, it is possible to remove a physical component (e.g., a cable) that has been required for wired communication between a plurality of slave controllers and a master controller, thereby improving the spatial efficiency of a battery pack and reducing an error caused by a defect in the physical component.

Additionally, according to at least one of the embodiments of the present disclosure, it is possible to protect a battery module included in a battery pack from over voltage, under voltage and/or over temperature in the event of maloperation of a wireless communication unit of a slave controller.

The effects of the present disclosure are not limited to the above-mentioned effects, and other effects not mentioned herein will be clearly understood by those skilled in the art from the appended claims.

BRIEF DESCRIPTION OF THE DRAWINGS

The accompanying drawings illustrate a preferred embodiment of the present disclosure, and together with the following detailed description of the present disclosure, serve to provide a further understanding of the technical aspects of the present disclosure, and thus the present disclosure should not be construed as limited to the drawings.

DETAILED DESCRIPTION

Figure 1:
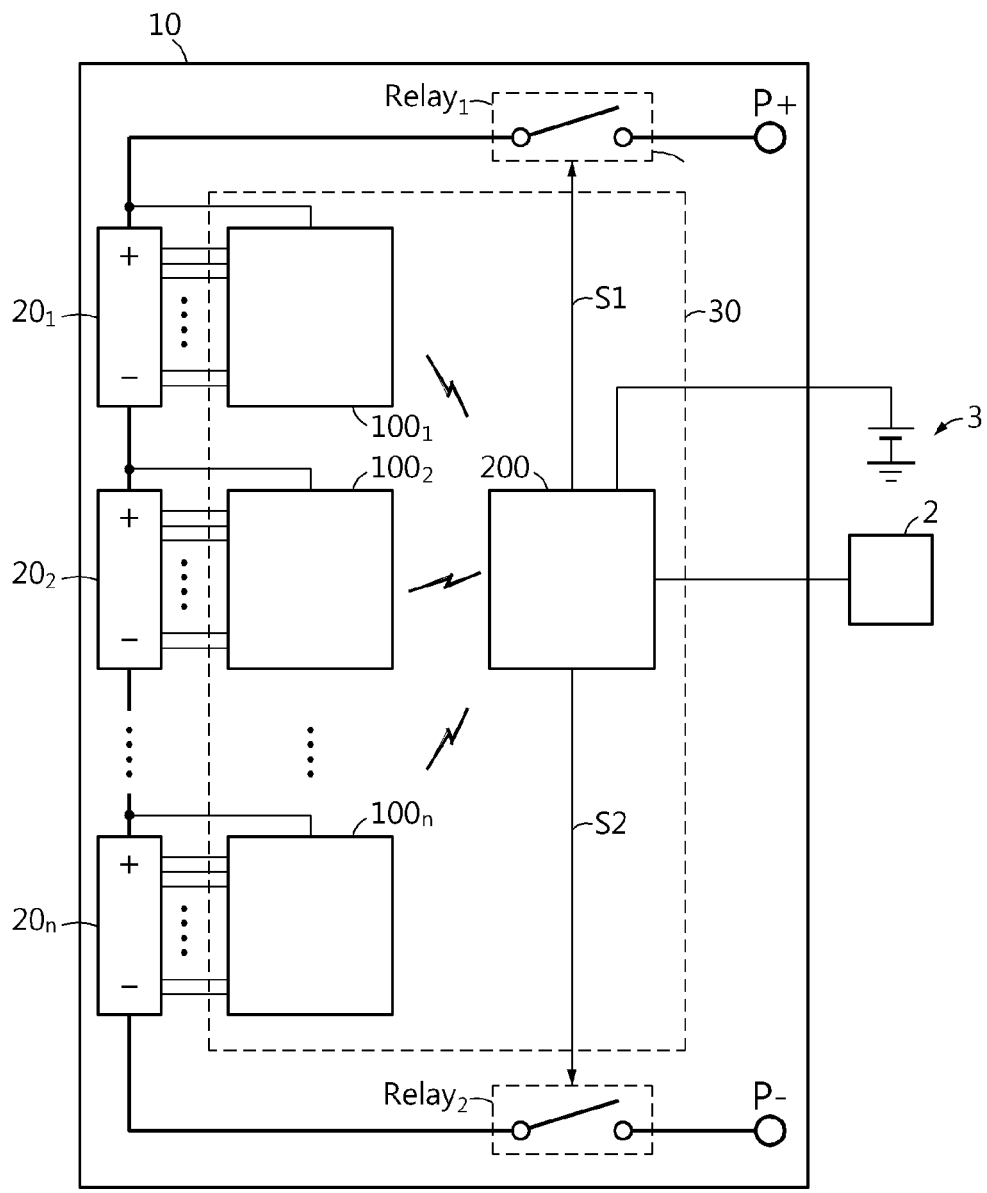
FIG. 1 is a schematic diagram showing an exemplary configuration of a wireless battery management system according to an embodiment of the present disclosure and a battery pack including the same.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could be made thereto at the time of filing the application.

Additionally, in describing the present disclosure, when it is deemed that a certain detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Unless the context clearly indicates otherwise, it will be understood that the term "comprises" or "includes" when used in this specification, specifies the presence of stated elements, but does not preclude the presence or addition of one or more other elements. Additionally, the term "control unit" as used herein refers to a processing unit of at least one function or operation, and this may be implemented by hardware or software alone or in combination.

In addition, throughout the specification, it will be further understood that when an element is referred to as being "connected to" another element, it can be directly connected to the other element or intervening elements may be present.

FIG. 1 is a schematic diagram showing an exemplary configuration of a wireless battery management system 30 according to an embodiment of the present disclosure and a battery pack 10 including the same.

Referring to FIG. 1, the battery pack 10 includes a plurality of battery modules $20_1$~$20_n$, at least one relay $Relay_1$, $Relay_2$ and a wireless battery management system 30. Each battery module 20 may include at least one battery cell (see '21' of FIG. 2). The wireless battery management system 30 includes a plurality of slave controllers $100_1$~$100_n$ and a master controller 200. The battery pack 10 may be mounted in an electric vehicle to supply power required to drive an electric motor of the electric vehicle.

The plurality of slave controllers $100_1$~$100_n$ is electrically coupled to the plurality of battery modules $20_1$~$20_n$ included in the battery pack 10 one-to-one.

The slave controller $100_i$ (i=1~n) is electrically connected to the battery module $20_i$ among the plurality of battery modules $20_1$~$20_n$. The slave controller $100_i$ measures the operational parameter (e.g., module voltage, cell voltage, temperature) associated with the state of the battery module $20_i$, and performs a variety of functions (e.g., balancing) for controlling the state of the battery module $20_i$. The operational parameter may be referred to as a 'characteristic value'. Each function may be performed directly by the slave controller $100_i$ based on the state of the battery module $20_i$, or may be performed according to a command from the master controller 200.

The master controller 200 may be wirelessly coupled to each of the plurality of slave controllers $100_1$~$100_n$ so as to be able to wirelessly communicate with each of the plurality of slave controllers $100_1$~$100_n$. The master controller 200 receives a sensing signal or a fault signal wirelessly transmitted from each of the plurality of slave controllers $100_1$~$100_n$. Additionally, the master controller 200 wirelessly transmits a command for controlling the state of at least one of the plurality of slave controllers $100_1$~$100_n$ based on the sensing signal. Additionally, the master controller 200 may shift at least one relay $Relay_1$, $Relay_2$ from a turn-on state to a turn-off state based on the fault signal.

Figure 2:
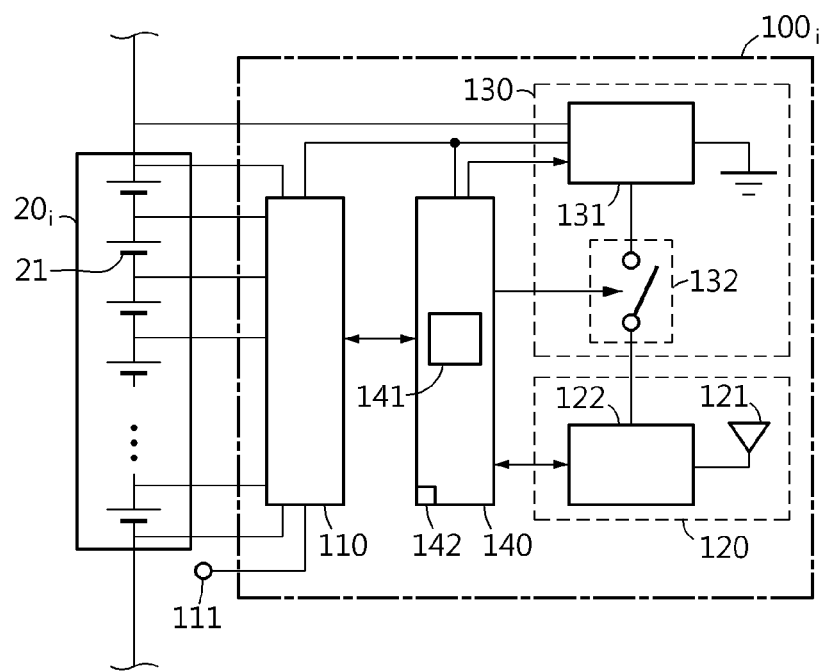
FIG. 2 is a schematic diagram showing an exemplary configuration of a slave controller shown in FIG. 1.

FIG. 2 is a schematic diagram showing an exemplary configuration of the slave controller according to an embodiment of the present disclosure.

Referring to FIG. 2, the slave controller $100_i$ may include a sensing unit 110, a wireless communication unit 120, a power supply unit 130 and a control unit 140.

The sensing unit 110 is configured to measure the operational parameter of the battery module $20_i$. To this end, the sensing unit 110 includes at least one of a voltage measurement circuit and a temperature measurement circuit. The voltage measurement circuit is configured to measure the module voltage of the battery module $20_i$ and/or the cell voltage of each battery cell 21 included in the battery module $20_i$. The module voltage corresponds to a difference between the highest potential and the lowest potential of the battery module $20_i$. The temperature measurement circuit is configured to measure the temperature of the battery module $20_i$ using a temperature sensor 111.

The wireless communication unit 120 includes an antenna 121 and a wireless communication circuit 122. The antenna 121 and the wireless communication circuit 122 are operably connected to each other. The wireless communication circuit 122 demodulates a wireless signal received by the antenna 121. Additionally, the wireless communication circuit 122 may modulate a signal provided from the control unit and provide it to the antenna 121. The antenna 121 may transmit a wireless signal corresponding to the signal modulated by the wireless communication circuit 122 to the master controller 200.

The power supply unit 130 outputs the operating voltage (e.g., 3.3V) using electrical energy stored in the battery module $20_i$. The power supply unit 130 includes a converter 131 and a switch 132. The switch 132 is electrically coupled between the converter 131 and the wireless communication unit 120, and configured to selectively open/close the power supply channel from the converter 131 to the wireless communication unit 120. The converter 131 converts the module voltage of the battery module $20_i$ into the operating voltage. The operating voltage generated by the converter 131 may be outputted to the wireless communication unit 120 through the switch 132. In detail, as the operating voltage from the converter 131 is supplied to the wireless communication unit 120 through the switch 132 while the switch 132 is turned on, the wireless communication unit 120 is activated using the operating voltage. On the contrary, as the operating voltage from the converter 131 is not supplied to the wireless communication unit 120 through the switch 132 while the switch 132 is turned off, the wireless communication unit 120 is inactivated. Of course, the operating voltage generated by the power supply unit 130 may be supplied to the sensing unit 110 and the control unit 140 even while the switch 132 is turned off.

The control unit 140 includes at least one processor 141 and a memory 142, and is operably connected to the sensing unit 110, the wireless communication unit 120 and the power supply unit 130. The control unit 140 is configured to manage the overall operation of the slave controller $100_i$ including the control unit 140.

The memory 142 included in the control unit 140 stores an ID allocated to the slave controller $100_i$. The ID may be used for the slave controller $100_i$ to perform wireless communication with the master controller 200. In this instance, the IDs allocated to the plurality of slave controllers $100_i$ may be different from IDs allocated to other slave controllers. Accordingly, the ID may be used for the master controller 200 to distinguish the slave controller $100_i$ from other slave controller.

The memory 142 included in the control unit 140 is not limited to a particular type and includes any known information storage means capable of recording, erasing, updating and reading data. For example, the memory 142 included in the control unit 140 may be dynamic random-access memory (DRAM), synchronous DRAM (SDRAM), flash memory, read-only memory (ROM), electrically erasable programmable ROM (EEPROM) and registers. The memory 142 included in the control unit 140 may store program codes defining the processes that can be executed by the control unit 140.

Meanwhile, the memory 142 included in the control unit 140 may be physically separated from the control unit 140, or may be integrated into a chip together with the control unit 140.

The control unit 140 provides the sensing signal from the sensing unit 110 to the wireless communication unit 120. The sensing signal indicates the operational parameter of the battery module $20_i$ measured by the sensing unit 110. Accordingly, the wireless communication unit 120 may transmit a wireless signal corresponding to the sensing signal from the sensing unit 110 to the master controller 200 through the antenna 121.

Each processor included in the control unit 140 may selectively include a processor, an application-specific integrated circuit (ASIC), a chipset, a logic circuit, a register, a communication modem and a data processing device known in the art to execute various control logics. At least one of the various control logics of the control unit 140 may be combined, and the combined control logics may be written in computer-readable coding system and recorded in computer-readable recording media. The recording media is not limited to a particular type and includes any type that can be accessed by a processor included in a computer. For example, the recording media includes at least one selected from the group consisting of ROM, RAM, register, CD-ROM, magnetic tape, hard disk, floppy disk and an optical data recording device. Additionally, the coding system may be modulated to a carrier signal and included in a communication carrier at a particular point in time, and may be stored and executed in computers connected via a network in distributed manner Additionally, functional programs, codes and code segments for implementing the combined control logics may be readily inferred by programmers in the technical field to which the present disclosure belongs.

Figure 3:
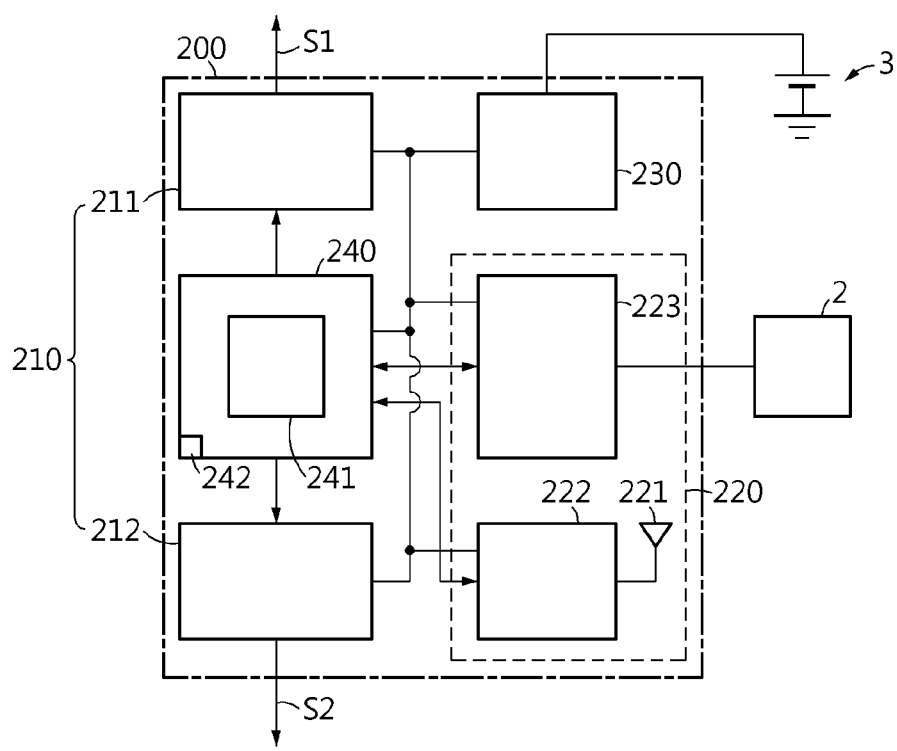
FIG. 3 is a schematic diagram showing an exemplary configuration of a master controller shown in FIG. 1.

FIG. 3 is a schematic diagram showing an exemplary configuration of the master controller 200 shown in FIG. 1.

Referring to FIG. 3, the master controller 200 may include a relay driving unit 210, a communication unit 220, a power supply unit 230 and a control unit 240.

The relay driving unit 210 individually controls at least one relay $Relay_1$, $Relay_2$ included in the battery pack 10. As shown, the relay $Relay_1$ may be installed at a high current path on the positive terminal P+ side of the battery pack 10, and the relay $Relay_2$ may be installed at a high current path on the negative terminal P− side. The relay driving unit 210 may include relay driving circuits 211, 212 for each relay. The relay driving circuit 211 turns on or off the relay $Relay_1$ by outputting a switching signal S1 having a duty cycle corresponding to the command from the control unit 240 to the relay $Relay_1$. The relay driving circuit 212 turns on or off the relay $Relay_2$ by outputting another switching signal S2 having a duty cycle corresponding to the command from the control unit 240 to the relay $Relay_2$.

The communication unit 220 includes an antenna 221, a wireless communication circuit 222 and a wired communication circuit 223. The wireless communication circuit 222 is operably connected to each of the antenna 221 and the wired communication circuit 223. The wireless communication circuit 222 may demodulate the wireless signal received through the antenna 221. Additionally, the wireless communication circuit 222 may modulate a signal to transmit to the slave controller $100_i$, and wirelessly transmit the modulated signal through the antenna 222. The antenna 221 may transmit a wireless signal corresponding to the signal modulated by the communication unit 220 to the slave controller $100_i$. The wired communication circuit 223 is coupled to an external device 2 so as to be capable of bidirectional communication with the external device 2. The wired communication circuit 223 wiredly transmits the signal received from the external device 2 to the control unit 240. Additionally, the wired communication circuit 223 wiredly transmits the signal received from the control unit 240 to the external device 2. In this instance, the wired communication circuit 223 and the external device 2 may communicate with each other using controller network area (CAN).

The power supply unit 230 generates an operating voltage using electrical energy supplied from an external power source 3 (e.g., a lead-acid battery of the electric vehicle). The operating voltage generated by the power supply unit 230 may be supplied to the relay driving unit 210, the communication unit 220 and/or the control unit 240.

The control unit 240 includes at least one processor 241 and a memory 242, and is operably connected to the communication unit 220. The memory 242 included in the control unit 240 may have an ID table pre-stored therein. The ID table includes each ID allocated to the plurality of slave controllers $100_1$~$100_n$. The memory 242 is not limited to a particular type and includes any known information storage means capable of recording, erasing, updating and reading data. For example, the memory 242 may be DRAM, SDRAM, flash memory, ROM, EEPROM and register. The memory 242 may store program codes defining the processes that can be executed by the control unit 240.

The memory 242 included in the control unit 240 may be physically separated from the control unit 240, and may be integrated into a chip together with the control unit 240.

The control unit 240 is configured to manage the overall operation of the master controller 200. Additionally, the control unit 240 may calculate a State Of Charge (SOC) and/or a State Of Health (SOH) of each of the plurality of slave controllers $100_1$~$100_n$ based on a wireless signal corresponding to the sensing signal wirelessly received from each of the plurality of slave controllers $100_1$~$100_n$ among the wireless signals received through the antenna 221. Additionally, the control unit 240 may determine a command for controlling the charge, discharge and/or balancing of each of the plurality of slave controllers $100_1$~$100_n$ based on the calculated SOC and/or SOH, and individually transmit the determined command to the plurality of slave controllers $100_1$~$100_n$.

Each processor included in the control unit 240 may selectively include a processor, an application-specific integrated circuit (ASIC), a chipset, a logic circuit, a register, a communication modem and a data processing device known in the art to execute various control logics. At least one of the various control logics of the control unit 240 may be combined, and the combined control logics may be written in computer-readable coding system and recorded in computer-readable recording media. The recording media is not limited to a particular type and includes any type that can be accessed by a processor included in a computer. For example, the recording media includes at least one selected from the group consisting of ROM, RAM, register, CD-ROM, magnetic tape, hard disk, floppy disk and an optical data recording device. Additionally, the coding system may be modulated to a carrier signal and included in a communication carrier at a particular point in time, and may be stored and executed in computers connected via a network in distributed manner Additionally, functional programs, codes and code segments for implementing the combined control logics may be readily inferred by programmers in the technical field to which the present disclosure belongs.

Figure 4:
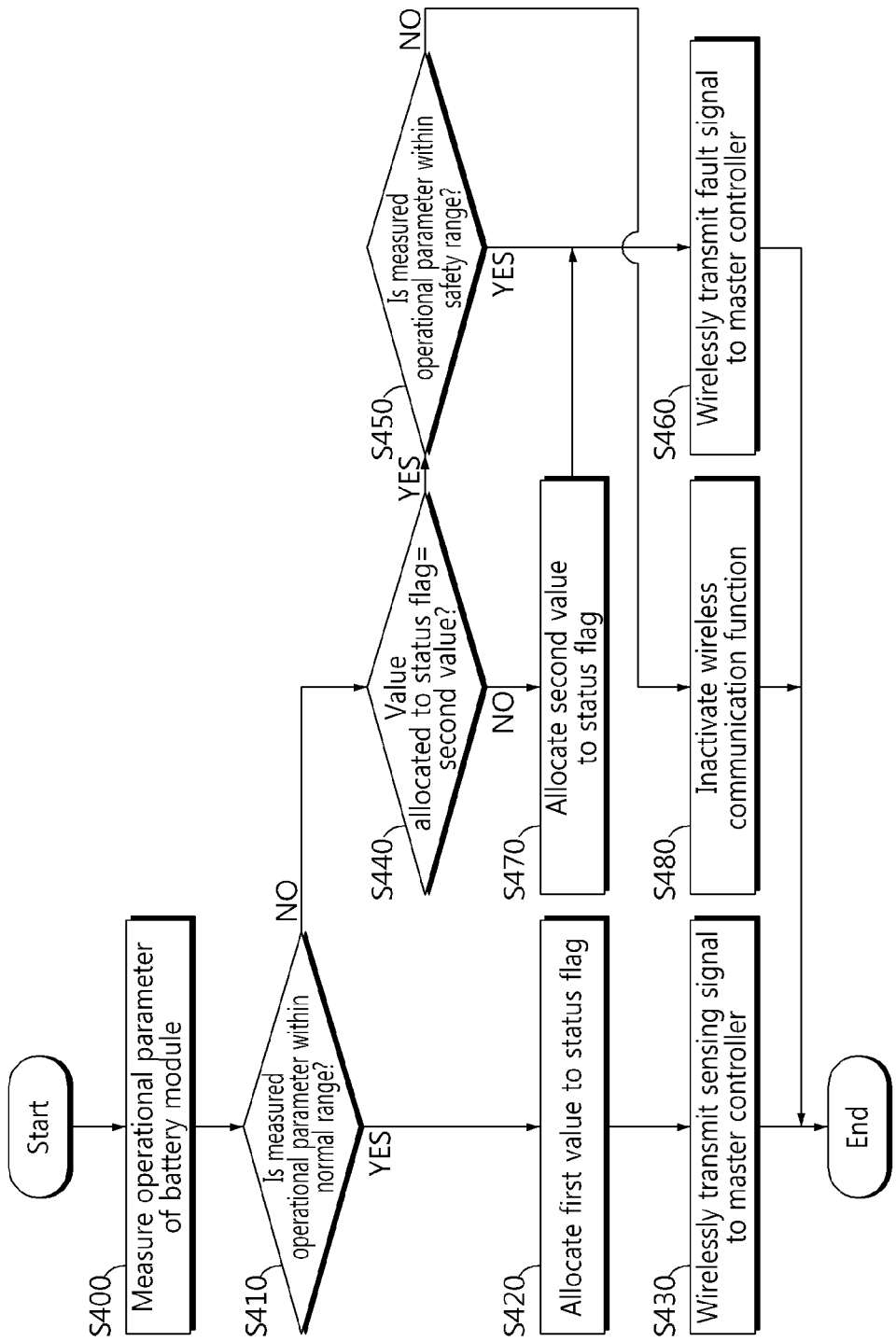
FIGS. 4 and 5 are flowcharts showing exemplary processes for protecting a battery pack according to another embodiment of the present disclosure.
Figure 5:
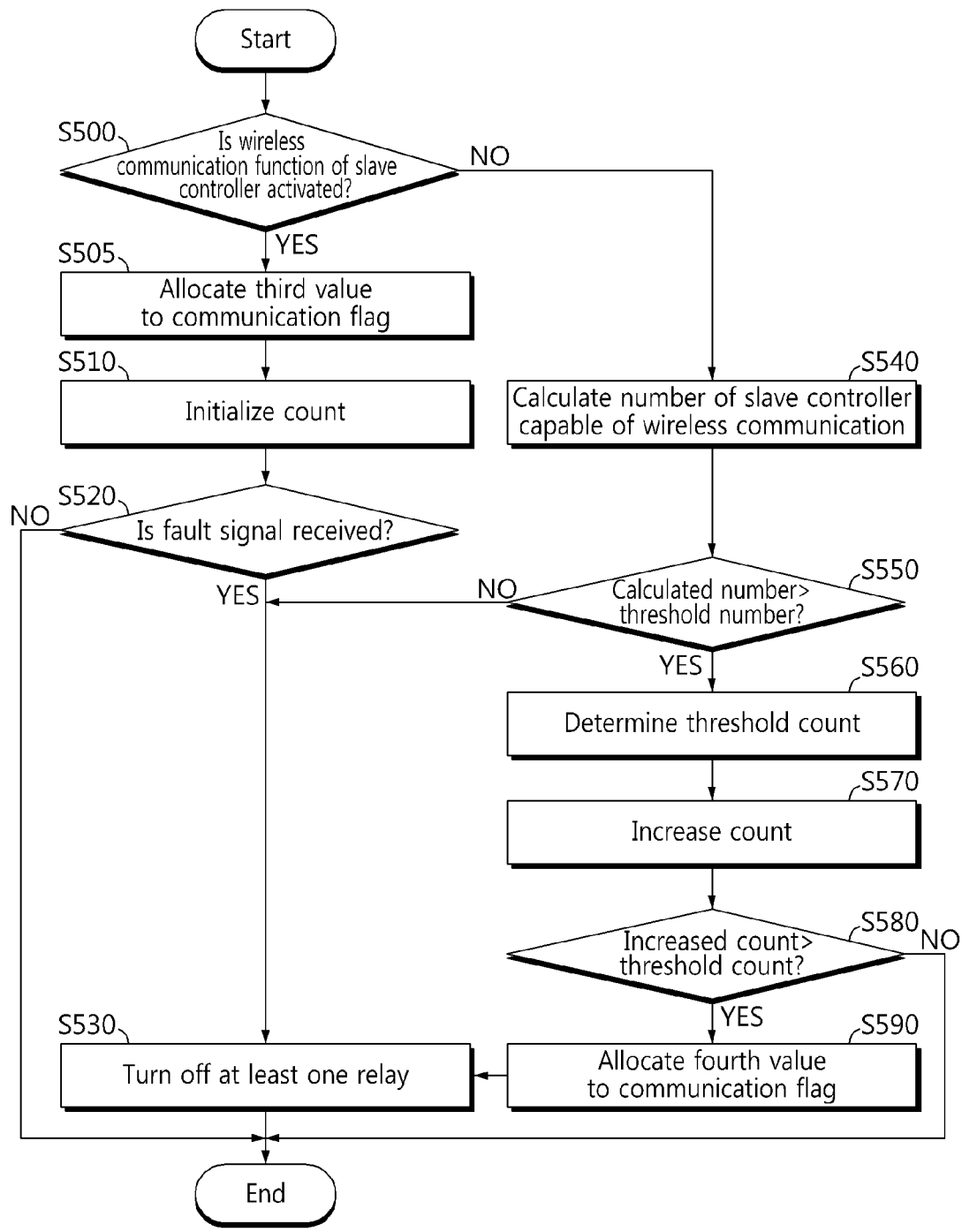

FIGS. 4 and 5 are flowcharts showing exemplary processes for protecting the battery pack according to another embodiment of the present disclosure. The process shown in FIGS. 4 and 5 may be repeatedly performed at a predetermined time interval.

Referring to FIG. 4, in the step S400, the slave controller $100_i$ measures the operational parameter of the battery module $20_i$. As described above, the operational parameter may be the cell voltage of each battery cell included in the battery module $20_i$ or temperature of the battery module $20_i$.

In the step S410, the slave controller $100_i$ determines whether the measured operational parameter is within a predetermined normal range. The normal range is a range of use without adversely influencing the life of each battery cell 21 included in the battery module $20_i$ on a predetermined level or more, and may be determined beforehand through experiments. In an example, when the cell voltage is higher than a first voltage upper limit (i.e., over voltage) or lower than a first voltage lower limit that is lower than the first voltage upper limit (i.e., under voltage), the measured operational parameter is determined to be outside of the normal range, and in other cases, the measured operational parameter is determined to be within the normal range. In another example, when the temperature of the battery module $20_i$ is higher than a first temperature upper limit or lower than a first temperature lower limit that is lower than the first temperature upper limit, the measured operational parameter is determined to be outside of the normal range, and in other cases, the measured operational parameter is determined to be within the normal range. When the value of the step S410 is "YES", the step S420 is performed. On the contrary, when the value of the step S410 is "NO", the step S440 is performed.

In the step S420, the slave controller $100_i$ allocates a first value (e.g., 0) to the status flag for the battery module $20_i$. The first value indicates that the battery module $20_i$ is in use without maloperation (e.g., over voltage, under voltage, over temperature). The status flag having the first value is stored in the memory 142 included in the control unit 140.

In the step S430, the slave controller $100_i$ wirelessly transmits a sensing signal indicating the measured operational parameter of the battery module $20_i$ to the master controller 200. In this instance, the slave controller $100_i$ may be supplied with electrical energy required to wirelessly transmit the sensing signal to the master controller 200 from the battery module $20_i$.

In the step S440, the slave controller $100_i$ determines whether a value allocated to the status flag for the battery module $20_i$ is equal to a second value (e.g., 1). The allocation of the second value to the status flag means that the measured operational parameter was already outside of the normal range in the previous process according to FIG. 4. When the value of the step S440 is "YES", the step S450 is performed. On the contrary, when the value of the step S440 is "NO", the step S470 is performed. For reference, the value of the step S440 being "NO" means that the value allocated to the status flag is the first value.

In the step S450, the slave controller $100_i$ determines whether the measured operational parameter is within a predetermined safety range. The safety range is defined as a range in which each battery cell 21 included in the battery module $20_i$ is used without an explosion risk, and is determined beforehand through experiments. The safety range is wider than the normal range. That is, the normal range may be a portion of the safety range. In an example, when the cell voltage is higher than a second voltage upper limit that is higher than the first voltage upper limit or lower than a second voltage lower limit that is lower than the first voltage lower limit, the measured operational parameter is determined to be outside of the safety range. In another example, when the temperature of the battery module $20_i$ is higher than a second temperature upper limit that is higher than the first temperature upper limit, the measured operational parameter is determined to be outside of the safety range. When the value of the step S450 is "YES", the step S460 is performed. On the contrary, when the value of the step S450 is "NO", the step S480 is performed.

Meanwhile, only when the operational parameter measured in the previous process according to FIG. 4 was already outside of the normal range, and the operational parameter measured in the current process according to FIG. 4 is outside of the safety range wider than the normal range, the value of the step S450 is "NO". This problem may occur when the fault signal is not wirelessly transmitted from the slave controller $100_i$ to the master controller 200 in the step S460 described below due to maloperation of the wireless communication unit 120 of the slave controller $100_i$.

In the step S460, the slave controller $100_i$ wirelessly transmits the fault signal to the master controller 200. The fault signal indicates that the state of the battery module $20_i$ is abnormal. In detail, the control unit 140 outputs a first control signal when the value of the step S450 is "YES". When the wireless communication unit 120 receives the first control signal from the control unit 140, the wireless communication unit 120 wirelessly transmits the fault signal to the master controller 200 using the operating voltage from the power supply unit 120. The fault signal may be wirelessly transmitted to the master controller 200 periodically until the operational parameter of the battery module $20_i$ is within the normal range.

In the step S470, the slave controller $100_i$ allocates the second value to the status flag for the battery module $20_i$. This is because the measured operational parameter is determined to be outside of the normal range in the step S410. After the step S470, the step S460 is performed.

In the step S480, the slave controller $100_i$ inactivates the wireless communication function. It is because of the high likelihood that the wireless communication unit 120 of the slave controller $100_i$ is malfunctioning as described above.

In detail, the control unit 140 of the slave controller $100_i$ outputs a second control signal to the power supply unit 130. When the power supply unit 130 receives the second control signal from the control unit 140, the power supply unit 130 stops outputting the operating voltage to the wireless communication unit 120 to inactivate the wireless communication function of the slave controller $100_i$ with the master controller 200. For example, when the switch 132 is turned off in response to the second control signal, the power supply channel from the converter 131 to the wireless communication unit 120 is blocked. As the wireless communication unit 120 cannot operate if the operating voltage is not outputted by the power supply unit 130, the slave controller $100_i$ does not wirelessly connect to the master controller 200 by the step S480.

Referring to FIG. 5, in the step S500, the master controller 200 determines whether the wireless communication function of the slave controller $100_i$ is activated. For example, the master controller 200 may wirelessly transmit a check signal to the slave controller $100_i$, and when the master controller 200 wirelessly receives a response signal to the check signal from the slave controller $100_i$, determine that the wireless communication function of the slave controller $100_i$ is activated. When the value of the step S500 is "YES", the step S505 is performed. On the contrary, when the value of the step S500 is "NO", the step S540 is performed.

In the step S505, the master controller 200 may allocate a third value (e.g., 0) to the communication flag for the slave controller $100_i$. The third value indicates that the wireless communication function of the slave controller $100_i$ is activated.

In the step S510, the master controller 200 initializes the count for the slave controller $100_i$. The count may be stored in the memory 242 through the previous process according to FIG. 5. The initialized count may be 0. The count before initialization being 1 or greater means that wireless communication with the slave controller $100_i$ is determined to be impossible in the S500 of the previous process according to FIG. 5.

In the step S520, the master controller 200 determines whether the fault signal was received from the slave controller $100_i$. When the value of the step S520 is "YES", the step S530 is performed. On the contrary, when the value of the step S520 is "NO", the process according to FIG. 5 ends.

In the step S530, the master controller 200 controls at least one relay $Relay_1$, $Relay_2$ to turn off at least one relay $Relay_1$, $Relay_2$. For example, the control unit 240 may electrically separate all the battery modules $20_1$~$20_n$ from the positive terminal P+ or the negative terminal P− of the battery pack 10 by setting the duty cycle of at least one of the switching signals S1,S2 outputted to the relay $Relay_1$ or the relay $Relay_2$ to 0%. Accordingly, charges and discharges of all the battery modules $20_1$~$20_n$ included in the battery pack 10 are simultaneously stopped, thereby protecting the battery module $20_i$ from over charge, over discharge and over temperature.

In the step S540, the master controller 200 calculates the number of slave controller capable of wireless communication with the master controller 200 among the plurality of slave controllers $100_1$~$100_n$. For example, n=10, i.e., when the total number of slave controllers is ten and the number of slave controllers in disconnected wireless communication with the master controller 200 is three, the number of slave controllers capable of wireless communication with the master controller 200 is seven. The control unit 240 may determine the number of communication flags having the third value among the communication flags for each slave controller as the number of slave controllers capable of wireless communication with the master controller 200.

In the step S550, the master controller 200 determines whether the calculated number is larger than the threshold number. The threshold number may be predetermined value, and data indicating the threshold number may be pre-stored in the memory 242. When the value of the step S550 is "YES", the step S560 is performed. On the contrary, when the value of the step S550 is "NO", the step S530 is performed. Those skilled in the art will easily understand that the value of the step S550 being "NO" means that the calculated number is equal to or less than the threshold number.

In the step S560, the master controller 200 determines a threshold count. The control unit 240 may determine the threshold count based on the calculated number. The calculated number and the threshold count may be in a proportional relationship. For example, when the calculated number is A, the threshold count may be a, and when the calculated number is B larger than A, the threshold count may be b larger than a. The memory 242 of the control unit 240 may store a lookup table in which a correlation between the calculated number and the threshold count is predefined, and the control unit 240 may determine the threshold count from the calculated number by referring to the lookup table.

Alternatively, the master controller 200 may use a given fixed value stored in the memory 242 included in the control unit 240 as the threshold count, and in this case, the step S560 may be omitted.

In the step S570, the master controller 200 increases the count for the slave controller $100_i$ by a predetermined value (e.g., 1). This is because the wireless communication function of the slave controller $100_i$ is determined to be inactivated in the step S500. That is, the control unit 240 may increase the count for the slave controller $100_i$ each time the wireless communication function of the slave controller $100_i$ is determined to be inactivated.

In the step S580, the master controller 200 determines whether the increased count is larger than the threshold count. Each process according to FIGS. 4 and 5 is performed repeatedly at the predetermined time interval. Thus the increased count larger than the threshold count means that the wireless communication function of the slave controller $100_i$ is continuously inactivated for a longer time than the time corresponding to the threshold count. When the value of the step S580 is "YES", the step S590 is performed. On the contrary, when the value of the step S580 is "NO", the process according to FIG. 5 ends.

In the step S590, the master controller 200 may allocate a fourth value (e.g., 1) to the communication flag for the slave controller $100_i$. The fourth value indicates that the wireless communication function of the slave controller $100_i$ is forcibly inactivated by the slave controller $100_i$ due to the high likelihood that the wireless communication unit 120 of the slave controller $100_i$ is malfunctioning. The communication flag allocated with one of the third value and the fourth value may be stored in the memory 242. After the step S590, the step S530 is performed.

When the wireless communication unit 120 of the slave controller $100_i$ temporarily operates incorrectly due to noise from the outside or the like, the value of the step S580 may be "NO". Accordingly, advantageously, at least one relay $Relay_1$, $Relay_2$ is not turned off frequently more than necessary due to sensitive response of the master controller 200 to the inactivation of the wireless communication function of the slave controller $100_i$.

The embodiments of the present disclosure described hereinabove are not implemented only through the apparatus and method, and may be implemented through programs that realize functions corresponding to the configurations of the embodiments of the present disclosure or recording media having the programs recorded thereon, and this implementation may be easily achieved by those skilled in the art from the disclosure of the embodiments previously described.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

DESCRIPTION OF REFERENCE NUMERALS

10: battery pack
20: battery module
30: wireless battery management system
100: slave controller
110: master controller

What is claimed is:

1. A wireless battery management system for protecting a battery pack including a plurality of battery modules and at least one relay, the wireless battery management system comprising:
   a plurality of slave controllers electrically coupled to the plurality of battery modules one-to-one; and
   a master controller wirelessly coupled to each slave controller so as to be able to communicate with each slave controller,
   wherein each slave controller includes:
   an operational parameter measurement circuit configured to measure an operational parameter of the battery module electrically coupled to said slave controller;
   a power supply configured to output an operating voltage using electrical energy stored in the battery module electrically coupled to said slave controller;

a wireless communication circuit configured to wirelessly transmit a sensing signal indicating the measured operational parameter to the master controller using the operating voltage; and
one or more processors operably coupled to the operational parameter measurement circuit, the power supply and the wireless communication circuit, and configured to control outputting a first control signal to the wireless communication circuit when the measured operational parameter is outside of a predetermined normal range,
wherein the wireless communication circuit is configured to wirelessly transmit a fault signal to the master controller when the first control signal is received, and
wherein the master controller is configured to turn off the at least one relay when the fault signal is received from at least one of the plurality of slave controllers,
wherein the one or more processors are configured to output a second control signal to a power supply when the measured operational parameter is outside of a predetermined safety range, the safety range being wider than the normal range, and
wherein the second control signal is configured to stop the power supply from outputting the operating voltage to inactivate a wireless communication function with the master controller.

2. The wireless battery management system according to claim 1, wherein the power supply includes:
a converter configured to convert a module voltage of the battery module into the operating voltage; and
a switch electrically coupled between the converter and the wireless communication circuit, and configured to supply the operating voltage from the converter to the wireless communication circuit while the switch is in a turn-on state, and
wherein the switch is configured to be turned off in response to the second control signal.

3. The wireless battery management system according to claim 1, wherein the operational parameter is a temperature of the battery module, a module voltage of the battery module or a cell voltage of each battery cell included in the battery module.

4. A battery pack comprising the wireless battery management system according to claim 1.

5. A wireless battery management system for protecting a battery pack including a plurality of battery modules and at least one relay, the wireless battery management system comprising:
a plurality of slave controllers electrically coupled to the plurality of battery modules one-to-one; and
a master controller wirelessly coupled to each slave controller so as to be able to communicate with each slave controller,
wherein each slave controller includes:
an operational parameter measurement circuit configured to measure an operational parameter of the battery module electrically coupled to said slave controller;
a power supply configured to output an operating voltage using electrical energy stored in the battery module electrically coupled to said slave controller;
a wireless communication circuit configured to wirelessly transmit a sensing signal indicating the measured operational parameter to the master controller using the operating voltage; and
one or more processors operably coupled to the operational parameter measurement circuit, the power supply and the wireless communication circuit, and configured to control outputting a first control signal to the wireless communication circuit when the measured operational parameter is outside of a predetermined normal range,
wherein the wireless communication circuit is configured to wirelessly transmit a fault signal to the master controller when the first control signal is received, and
wherein the master controller is configured to:
calculate a number of slave controllers capable of wireless communication with the master controller from the plurality of slave controllers, and
turn off the at least one relay when the calculated number is equal to or less than a threshold number.

6. The wireless battery management system according to claim 5, wherein the master controller is configured to:
increase a count for each slave controller each time a wireless communication function of each slave controller is determined to be inactivated, and
turn off the at least one relay when the increased count is larger than a threshold count.

7. The wireless battery management system according to claim 6, wherein the master controller is configured to determine the threshold count based on the calculated number when the calculated number is larger than the threshold number.

8. The wireless battery management system according to claim 5, wherein the operational parameter is a temperature of the battery module, a module voltage of the battery module or a cell voltage of each battery cell included in the battery module.

9. A battery pack comprising the wireless battery management system according to claim 5.

10. A method for protecting a battery pack using a wireless battery management system for the battery pack including a plurality of battery modules and at least one relay, the wireless battery management system including a plurality of slave controllers electrically coupled to the plurality of battery modules one-to-one, and a master controller wirelessly coupled to each slave controller so as to be able to communicate with each slave controller, the method comprising:
measuring, by each slave controller, an operational parameter of the battery module;
wirelessly transmitting, by each slave controller, a sensing signal indicating the measured operational parameter to the master controller using electrical energy stored in the battery module;
wirelessly transmitting, by each slave controller, a fault signal to the master controller when the measured operational parameter is outside of a predetermined normal range;
inactivating, by each slave controller, a wireless communication function of each slave controller when the measured operational parameter is outside of a predetermined safety range, the safety range being wider than the normal range; and
turning off, by the master controller, the at least one relay when the fault signal is received from at least one of the plurality of slave controllers or when the wireless communication function of at least one of the plurality of slave controllers is inactivated for a time corresponding to a threshold count or longer.

* * * * *